W. G. R. SLEEMAN.
GUARD FOR VEHICLES.
APPLICATION FILED APR. 6, 1918.

1,325,705.

Patented Dec. 23, 1919.

Inventor
W. G. R. Sleeman.
By Albert Parker
Attorney.

UNITED STATES PATENT OFFICE.

WILLIAM G. R. SLEEMAN, OF NEW YORK, N. Y.

GUARD FOR VEHICLES.

1,325,705.    Specification of Letters Patent.    Patented Dec. 23, 1919.

Application filed April 6, 1918. Serial No. 226,973.

*To all whom it may concern:*

Be it known that I, WILLIAM GILBERT RICHARD SLEEMAN, a subject of the King of Great Britain and Ireland, residing at 121 West 41st street, New York city, in the county of New York and State of New York, have invented certain new and useful Improvements in Guards for Vehicles, of which the following is a specification.

This invention relates to guards for vehicles, such as motor cars or locomotives, and its chief object is to provide means which will prevent a person who has been struck by a car and thrown to the ground, from being subsequently run over by the wheels of the car.

With this end in view, I provide a guard, carried by the wheel, and so arranged that it will push such person aside, out of the path of the wheel and thus prevent serious injury to the person. By its arrangement, my new guard may also serve to push large objects or obstructions in the road, out of the path of the car, thus avoiding the shock to which the car would be subjected if the wheels came in contact with such object or obstruction. The guard is mounted however, in such a way that it will not disturb small obstructions, such as stones, etc., which would not be harmful to the car, but that it will simply pass over such small obstructions.

My invention will now be fully described and the novel features will be pointed out in the appended claims.

Figure 1:
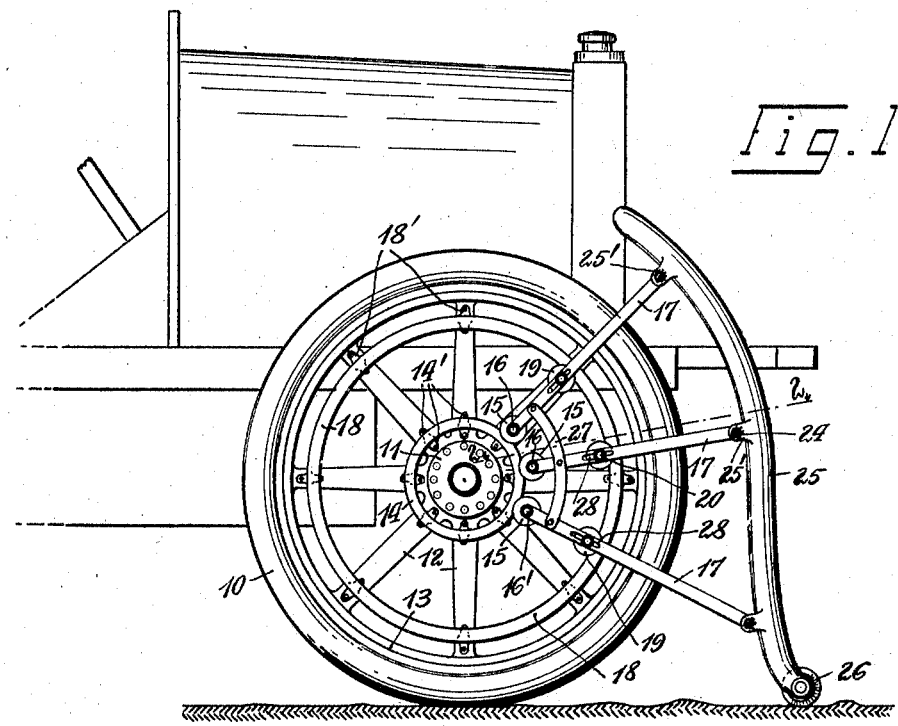
Figure 2:
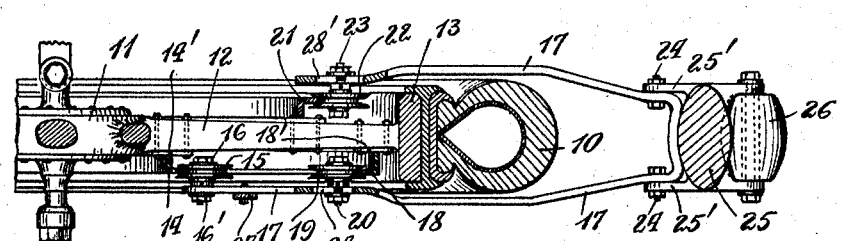
Figure 3:
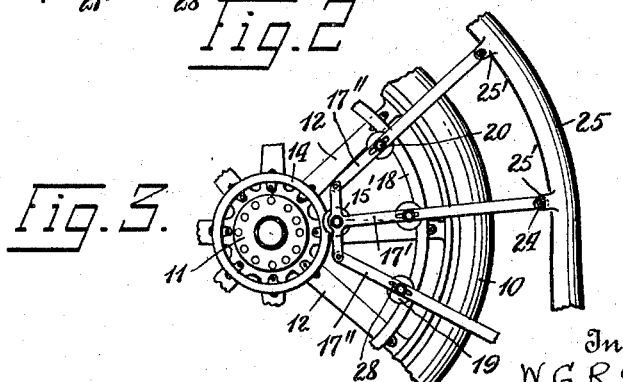

In the accompanying drawings, forming part of this specification, Figure 1 is a side elevation of the front part of an automobile, showing my guard applied to one of the front wheels; Fig. 2 is a partial section, taken substantially on line 2—2 of Fig. 1, and shown on an enlarged scale; and Fig. 3 is a partial view similar to Fig. 1, but showing a slightly modified construction.

The wheel 10 may be of any desired construction, with a hub 11, spokes 12 and a felly 13. To the spokes 12 is secured, near the hub 11, as by means of screws or bolts extending through lugs 14', an annular angle iron 14, the free flange of which extends outwardly, away from the axis of the wheel, and forms a track for flanged rollers 15. In Fig. 1, I have shown three such rollers 15, each carried by a stud 16 on which it may turn freely; each stud 16 is secured, by means of a nut 16', to one end portion of a radially-extending U-shaped bar or brace 17 projecting beyond the periphery of the wheel, and embracing the latter. At a point adjacent the felly 13, the spokes 12 carry another annular angle iron, 18, secured to such spokes by means of screws or bolts extending through lugs 18' on said angle iron. The free flange of this angle iron, however, faces inwardly, toward the axis of the wheel, and forms a track for flanged rollers 19 carried by studs 20 which are also secured to the radially-extending braces 17. On the other side of the wheel, the spokes carry an outwardly-directed track 21 similar to track 14, this track 21 being engaged by flanged rollers 22 carried by studs 23 secured to the other ends of the braces 17.

The outermost portions of the bars or braces 17 are secured, as for instance by bolts 24, to lugs 25' extending from the sides of the guard proper or fender 25, the upper portion of which is curved substantially according to the outline of the wheel, while its lower portion is bent forward, as shown in Fig. 1. At its lower end, the guard 25 is preferably forked and forms a bearing for a suitable roller or small wheel 26 which is provided with a pneumatic or solid rubber tire, and runs preferably on suitable ball or roller bearings. The roller 26 is made wide enough to prevent its getting caught in street-car tracks, and if desired, this roller may be held in its lower position by suitable springs permitting a slight upward yielding movement of the roller. As shown in Fig. 2, the guard 25 is preferably made of oval cross section, in order to give it the proper strength, without presenting any sharp edges or corners.

For greater strength of the structure, the bars 17 may be connected at a point intermediate the inner and outer set of rollers, by a brace 27. As will be seen from Fig. 1, I have shown on one side of the wheel only one set of rollers (the outer set), and only one track. I might of course provide on this side also an inner track and an inner set of rollers; I prefer, however, to omit this inner set of rollers and the inner track on the one side of the wheel, so that my guard mechanism may not interfere with certain devices, such as speedometers, etc., which are frequently carried on one side of the front wheel, adjacent to its hub.

In order to facilitate the mounting of my new guard mechanism on the wheel, the bars 17 are provided with longitudinal slots 28, 28', through which extend the studs 20 and 23 of the outer sets of rollers. This will allow the rollers 19 and 22 to be shifted outwardly and inwardly into engagement with their respective tracks, after the device has been placed in its proper position on the wheel, whereupon the studs 20 and 23 are screwed to the bars 17 tightly, with the flanged rollers 19, 22 in proper engagement with their tracks.

In the modification shown in Fig. 3, I use instead of three rollers running on the inner track, only a single roller, 15', carried preferably on the central brace, 17', the outer bars, 17'', being secured to lateral extensions of the central brace or bar 17'.

In operation, the guard will be carried on the front wheel of the vehicle, with the roller or small wheel 26 running on the ground, in advance of said front wheel, and with the flanged rollers running on their respective tracks, which latter are being carried around by the rotation of the wheel. It will be seen that the guard can swing up freely on the wheel when its front roller 26 meets small obstructions in the road; when, however, a large obstruction is encountered, the guard will with its forward end tend to get under such obstruction and push it out of the way. Similarly, when a person has been knocked down by the vehicle, or has, owing to some other cause, fallen in front of such vehicle, the guard will push such person aside, out of the path of the wheel, and thus prevent such person from being run over by the vehicle. If desired, the lowermost portion of the guard may be hingedly connected thereto and movable rearwardly against the action of a spring of sufficient strength to normally prevent such rearward movement of the hinged portion while permitting such movement if the guard should strike an immovable object such as a curbing. Also the guard may be held by a spring suitably connected to an adjacent part of the machine, so that the roller will not fall below the normal road level.

Various modification may be made without departing from the nature of my invention as set forth in the appended claims.

I claim as my invention:

1. The combination with a vehicle wheel, of a guard located in advance of said wheel and means entirely carried by and movable with said wheel supporting said guard against direct rearward movement and guiding said guard for movement about the wheel axis.

2. The combination with a vehicle wheel, of a guard located in advance of said wheel, means entirely carried by and movable with said wheel supporting said guard against direct rearward movement and guiding said guard for movement about the wheel axis, and a roller mounted at the lower end of the guard and normally resting on the road surface to support said guard.

3. The combination with a vehicle wheel, of a guard member in advance of the wheel, guiding means carried by said wheel on both sides thereof and rotating therewith, and means on said guard member extending on opposite sides of said wheel and co-acting with said guiding means to guide the guard for movement about the wheel axis, while preventing direct rearward movement of the guard.

4. The combination with a vehicle wheel, of a guard member located in advance of said wheel, and means entirely carried by said wheel supporting said guard for independent movement about the axis of the wheel while preventing direct rearward movement.

5. The combination with a vehicle wheel, of a guard located in advance of the wheel, a roller mounted in the guard at its lowermost portion, so as to normally support the guard from the ground, and means for connecting said guard to both sides of the wheel in such a way as to allow independent movement of the guard relatively to the wheel about the wheel axis.

6. The combination with a vehicle wheel, of a circular track secured thereto to rotate therewith, a guard provided with guiding means for engaging said track, and a roller carried by said guard at its lower end, said roller being adapted to travel on the ground, in advance of said wheel.

7. The combination with a vehicle wheel, of two circular tracks facing toward each other, a guard for said wheel, flanged rollers on said guard in engagement with said tracks, so as to allow relative circumferential movement between said wheel and said guard, but to prevent radial movement of said guard with respect to said wheel, and a roller at the lower end of said guard and adapted to travel in advance of said wheel.

8. The combination with a vehicle wheel, of circular tracks on both of its sides, a guard for said wheel, braces extending from said guard toward said wheel in a substantially radial direction, rollers carried by said braces and adapted to travel on said tracks, and a roller at the lower end of said guard and adapted to travel on the ground, in advance of said wheel.

9. The combination with a vehicle wheel, of two circular tracks facing toward each other and secured to the wheel at one side thereof, a guard located in advance of said wheel and rollers on said guard in engagement with said tracks guiding the guard for movement about the wheel axis while preventing direct rearward movement thereof.

In testimony whereof I affix my signature.

WILLIAM G. R. SLEEMAN.